United States Patent
Bissonnette et al.

(10) Patent No.: US 7,064,559 B2
(45) Date of Patent: Jun. 20, 2006

(54) NON INTRUSIVE AND DYNAMIC METHOD FOR MEASURING A DISTANCE OR THE VARIATION THEREOF THROUGH DIELECTRICS

(75) Inventors: Marc Bissonnette, Boucherville (CA); Jean Pronovost, St-Mathieu-de-Beloei (CA); Marius Cloutier, Longueuil (CA)

(73) Assignee: Vibrosystm Inc., Montreal (CA)

( * ) Notice: Subject to any disclaimer, the term of this patent is extended or adjusted under 35 U.S.C. 154(b) by 0 days.

(21) Appl. No.: 10/468,148

(22) PCT Filed: Mar. 25, 2002

(86) PCT No.: PCT/CA02/00406

§ 371 (c)(1),
(2), (4) Date: Feb. 11, 2004

(87) PCT Pub. No.: WO02/077566

PCT Pub. Date: Oct. 3, 2002

(65) Prior Publication Data

US 2004/0135588 A1 Jul. 15, 2004

(30) Foreign Application Priority Data

Mar. 23, 2001 (CA) .................................. 2342092

(51) Int. Cl.
*G01R 27/26* (2006.01)

(52) U.S. Cl. ...................... 324/662; 324/658; 324/671; 324/71.1

(58) Field of Classification Search ................ 324/658, 324/661–664, 671, 71.1, 690, 772
See application file for complete search history.

(56) References Cited

U.S. PATENT DOCUMENTS

| | | | | |
|---|---|---|---|---|
| 3,628,136 A | * | 12/1971 | Jonas | 324/519 |
| 4,675,670 A | | 6/1987 | Lalonde et al. | 340/870.37 |
| 4,766,389 A | * | 8/1988 | Rhoades et al. | 324/662 |
| 4,963,829 A | * | 10/1990 | Wereb | 324/660 |
| 5,295,388 A | * | 3/1994 | Fischer et al. | 73/12.09 |
| 5,493,894 A | | 2/1996 | Dailey et al. | 73/12.09 |
| 5,524,474 A | | 6/1996 | Lavallee et al. | 73/12.09 |
| 5,990,807 A | * | 11/1999 | Cloutier et al. | 340/870.37 |
| 6,011,294 A | * | 1/2000 | Wetzel | 257/434 |
| 6,075,464 A | * | 6/2000 | Cloutier et al. | 340/870.37 |

\* cited by examiner

*Primary Examiner*—Vincent Q. Nguyen
*Assistant Examiner*—John Zhu
(74) *Attorney, Agent, or Firm*—Ogilvy Renault, LLP (57) ABSTRACT

A non intrusive method and system for the dynamic measurement of a distance, or the variations over time thereof, constituting the thickness, or the variations thereof, of a thin compressible dielectric material located between one or several other closely spaced solid dielectric layers of constant thickness and a conductive or semi-conductive surface. This is achieved by positioning a capacitive sensor on the external layer of the dielectric material, the sensor being composed of two parallel plates electrically insulated from one another, feeding the first plate with a high frequency signal, measuring the voltage and current value over time generated by the high frequency signal between the plate of the sensor which is closest to the surface of the outer layer of dielectric material, and deducting the above distance or variations thereof.

6 Claims, 5 Drawing Sheets

NON INTRUSIVE AND DYNAMIC METHOD FOR MEASURING A DISTANCE OR THE VARIATION THEREOF THROUGH DIELECTRICS

CROSS-REFERENCE TO RELATED APPLICATIONS

This application is a national phase entry of International Application No. PCT/CA02/00406 filed on Mar. 25, 2002 which claims priority of Canadian patent application No. 2,342,092 filed on Mar. 23, 2001, the specifications of which are hereby incorporated by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

BACKGROUND OF THE INVENTION

1. Field of the Invention

This invention relates to a non intrusive method aid system for the measurement of a distance, or the variations over time thereof, constituting the thickness or the variations thereof of a compressible dielectric material located between one or several other closely spaced solid dielectric layers of constant thickness and a conductive or semi-conductive surface, and more particularly for detecting and measuring the vibrations of the stator bars of an electrical generator or motor while said generator or motor is operating and whether said generator is a hydrogenerator or a turbogenerator.

2. Description of Related Art

The stator winding insulation system of an electric generator is exposed to harsh operating conditions. When the wedging system no longer holds the stator bars in place, vibrations set in. As stator bar retention within the slot gradually weakens, partial discharges slowly increase in intensity, and insulation is undermined. As this action progresses, side-erosion destroys the semi-conductive painting of the bar and intensifies the vibrations of the bar and the partial discharges. If such harmful vibration activity is not detected from the beginning and corrective actions are not taken, rapid insulation deterioration may lead to irreversible damages or aging so severe that repair and even partial or complete rewinding become necessary.

Several detection systems and techniques address this problem.

A method commonly employed for assessing the stator wedge tightness of a generator consists in hitting with a hammer each of the stator wedges to detect from the sound produced how tightly the wedges are held in place by the pressure of the springs attached to them. Such method has the disadvantage of requiring the generator to be stopped in most cases and the rotor to be dismantled at least partly.

More recently, U.S. Pat. No. 5,493,894 (Dailey et al.) presents a method and a system assembly by which an impact is created against the stator core lamination and a vibration sensor receives vibrations from said stator coil lamination. Such method and system require the electrical generator to be stopped and opened and the rotor completely dismantled for the temporary installation of the impact assembly and of the vibration sensor. Such method presents the disadvantages of being static, intrusive and cannot describe in a continuous manner how the wedge behaves while the generator is running.

U.S. Pat. No. 5,524,474 (Lavallee et al.) describes a method and assembly which uses a thin flat piston-mounted sensor inserted in the air-gap between the rotor and stator and positioned in front of the stator wedge to be evaluated. A variable pressure is applied to the piston of the sensor, causing a displacement of the wedge which is used to determine its tightness. This method and apparatus does not necessitate the dismantling of the rotor, but such measurement is static, while the generator is stopped, and cannot describe in a continuous manner bow the wedge behaves while the generator is running.

U.S. Pat. No. 4,675,670 (Lalonde et al.) describes a capacitive method to measure dynamically, the air-gap and its variation over time existing between the rotor and the stator of an electrical generator while the generator is running. Such method has been adapted by the licensee of said patent. VibroSystM Inc., also an assignee of the present application, to measure the vibrations of stator wedges of an electric generator by embedding capacitive sensors in stator slots, each such capacitive sensor facing a stator bar and measuring the gap between itself and the stator bar. This method, while efficient, presents the drawback of requiring the replacement of the existing wedge with a special wedge which accommodates the embedded capacitive sensor and its supporting assembly. This method is intrusive and locally modifies the existing stator configuration and installation.

Therefore, there is a need for a non intrusive and dynamic method to detect on a continuous basis the changes in tightness of the wedges of stator bars in electric generators and motors, while said generators and motors are running.

BRIEF SUMMARY OF THE INVENTION

A first object of this invention is a method and a system to measure, in a non intrusive way, and from the outside, the thickness or the variations over time thereof, of a compressible dielectric material which lies between other thin and solid dielectric layers of constant thickness and a grounded conductive or semi-conductive surface.

A second object of this invention is a method and a system to measure, in a non intrusive way, and from the outside, the thickness or the variations over time thereof of a small air or gaseous gap situated between a dielectric layer of constant or known thickness and said conductive or semi-conductive surface.

A third object of this invention is to measure, in a non intrusive and dynamic way, from the outside of the stator of an electrical generator or motor, the vibrations of an air gap which results from the vibrations of the bars of said stator while the electrical generator or motor is running.

A fourth object of this invention is to detect and measure, in a non disruptive and dynamic way, the radial vibrations or displacement in time of a shaft rotating around its longitudinal axis, when the atmosphere surrounding said shaft contains liquid particles of oil or other lubricants.

A fifth object of this invention is to detect and measure, in a non intrusive and dynamic way and from the outside, the passage of a fluid or the variation of the level of a fluid in an air or gaseous gap which lies between other thin and solid dielectric layers of constant thickness and a grounded conductive or semi-conductive surface.

These and other objects of the invention may be achieved by providing a method for the non-contact measurement of the distance and of the variation over time thereof separating the surface of a grounded conductive or semi-conductive component from the nearest surface of one or several parallel layers of solid dielectric substances closely but variably spaced from said component and facing it, said variable distance being filled with a compressible dielectric substance, comprising the steps of:

positioning a capacitive sensor on the external surface of the external layer of said solid dielectric substances, said sensor being composed of a first and a second parallel superimposed conductive or semi-conductive plates electrically insulated from one another, and said plates being parallel to the parallel layers of dielectric substances;

feeding said first plate of said sensor a high frequency signal;

measuring the voltage and current values over time generated by said high frequency signal between the second plate of said sensor which is closest to the surface of said outer layer of solid dielectric substances and the facing surface of the conducting or semi-conducting component;

deducting by processing means, from the current values and variations, the values and variations over time of the distance separating the inner surface of the inner solid dielectric layer facing the surface of the conductive or semi-conductive component.

In accordance with a preferred embodiment, the compressible dielectric substance is air or gas and is situated anywhere between the parallel layers of solid dielectric substances.

In accordance with another embodiment, the method according to invention allows the measurement of the permittivity and the variations over time thereof of a dielectric substance which thickness is constant and known and closely spaced with other closely spaced dielectric layers which respective permittivities and thickness are known.

In accordance with yet another embodiment, the dielectric constants and thickness of each solid dielectric layers are known, thereby allowing not only to detect the variations of the distance over time but also the value of the distance itself at a given instant.

According to yet another embodiment, the method according to the invention allows the measurement of the vibrations of the stator bars of an electric generator wherein the capacitive sensor is affixed on the rotor-side surface of the tightening wedge of the corresponding stator bar and wherein the distance to be measured over time is the air gap between the stator-side of said wedge and the rotor-side surface of said stator bar.

According to yet another embodiment, the method according to the invention allows the measurement of the radial movements and vibrations of a shaft made of conductive or semi-conductive material and rotating in an heterogeneous and turbulent atmosphere charged with particles wherein a protective cover constituted of semi-rigid dielectric material creates a clean and variable air-gap between the capacitive sensor and the outer surface of said shaft by brushing against said outer surface.

According to still yet another embodiment, the method according to the invention allows the detection of the passage or the measurement of the change of level of a fluid in front of a capacitive sensor, said passage or change of level occurring in a space located anywhere between solid layers of dielectrics and a conductive or semi-conductive surface.

BRIEF DESCRIPTION OF THE SEVERAL VIEWS OF THE DRAWINGS

Further features and advantages of the present invention will become apparent from the following detailed description, taken in combination with the appended drawings, in which.

DETAILED DESCRIPTION OF THE INVENTION

Figure 1:
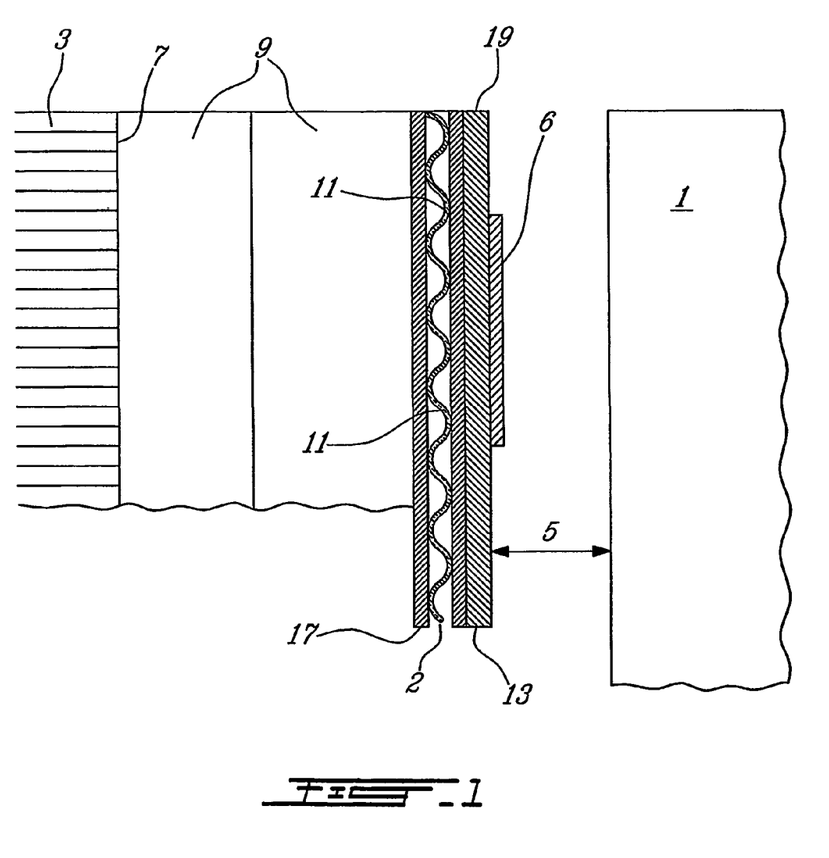
FIG. 1 shows a cross section side view of the stator and rotor of an electric generator with a schematic representation of a stator bar and its restraining wedge, as well as the location of the capacitive sensor.
Figure 2:
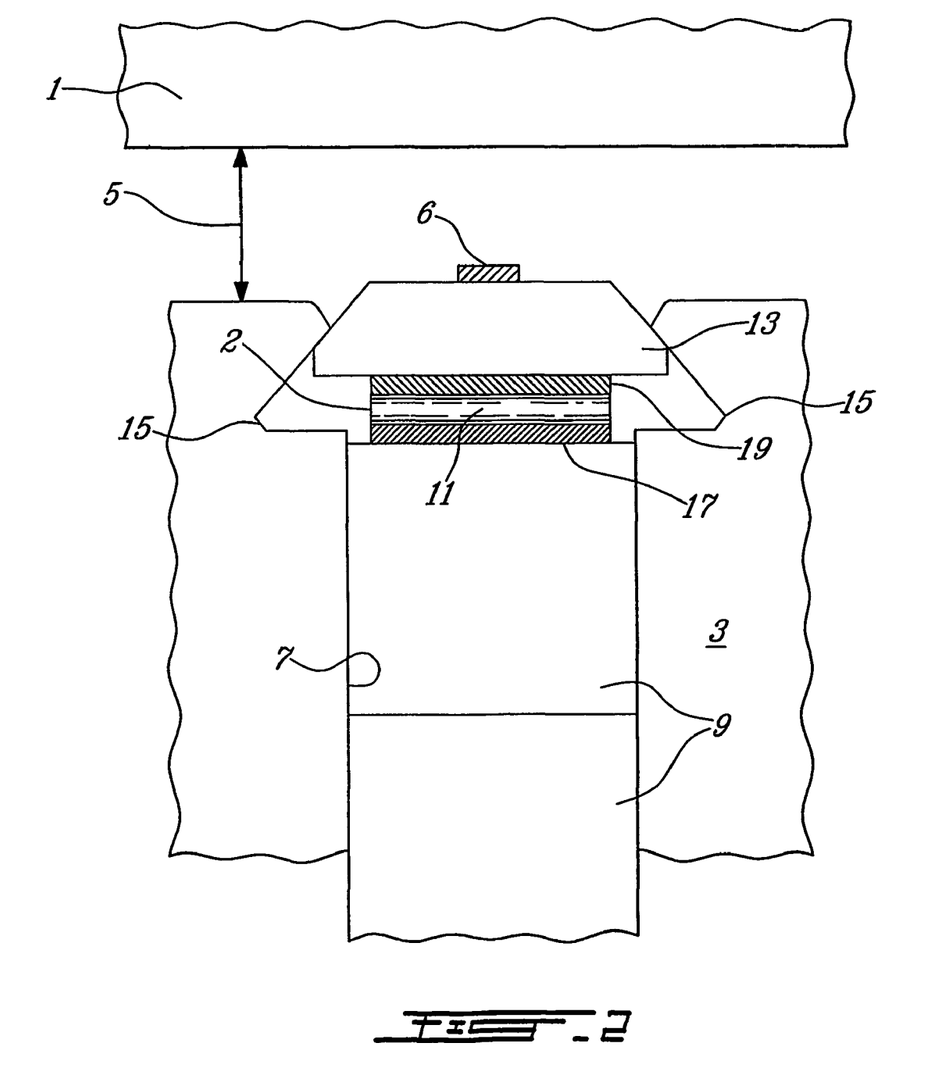
FIG. 2 shows the top view corresponding to FIG. 1.

With reference to the Figures, which represent the preferred embodiment, the invention is explained as follows:

Referring to FIG. 1 and FIG. 2, the method according to the invention is intended to be used to quantitatively evaluate the stator wedge tightness of an electric generator comprising a rotor 1 and a stator 3 which together define an air gap 5 of a given width. Stator 3 is provided with radial slots 7 having outlets which open out to the air gap 5 and in each of which are retained one or more stator bars 9 by means of a resilient holding means which generally consists of ripple springs 11 made of insulated material, that are undulated either lengthwisely or radially. In the drawings, the illustrated resilient holding means exclusively consists of a lengthwisely undulated ripple spring 11 which abuts against stator wedges 13 of trapezoidal cross-section slidably inserted into a set of groves 1S symmetrically provided for such purpose in the stator at the outlet of each slot 7.

In the illustrated embodiment, ripple spring 11 consists of an elongated leaf of composite material which abuts either directly or through a length of packing material 17 and a plurality of quoins 19, respectively OD the adjacent stator bar 9 and on the stator wedges 13 which are themselves also made of composite material.

It must be understood that when wedge tightness is optimal, said ripple spring is flat, and when wedge tightness loosens, the undulations of the ripple spring increase progressively, thus letting an air gap 2 appear between wedge 13 or quoin 19 when it exists and bar 9 or packing material 17 when it exists.

It now appears clearly that if wedge tightness loosens, bars 9 will start to vibrate and such vibrations will directly make air gap 2 vibrate in the exact same manner.

If a capacitive sensor 6 is affixed on stator wedge 13 and, instead of measuring the air gap 5 as in U.S. Pat. No. 4,675,670, said sensor 6 is facing the opposite direction for measuring air gap 2, through dielectrics 13 (and quoin 19 when it exists) it has been found that the voltage output measured between the second plate of the sensor 6 which is closest to the surface of wedge 13 and the semi-conductive surface of bars 9, when capacitive sensor 6 is fed a high frequency signal, is a function of the thickness of air gap 2.

Figure 3:
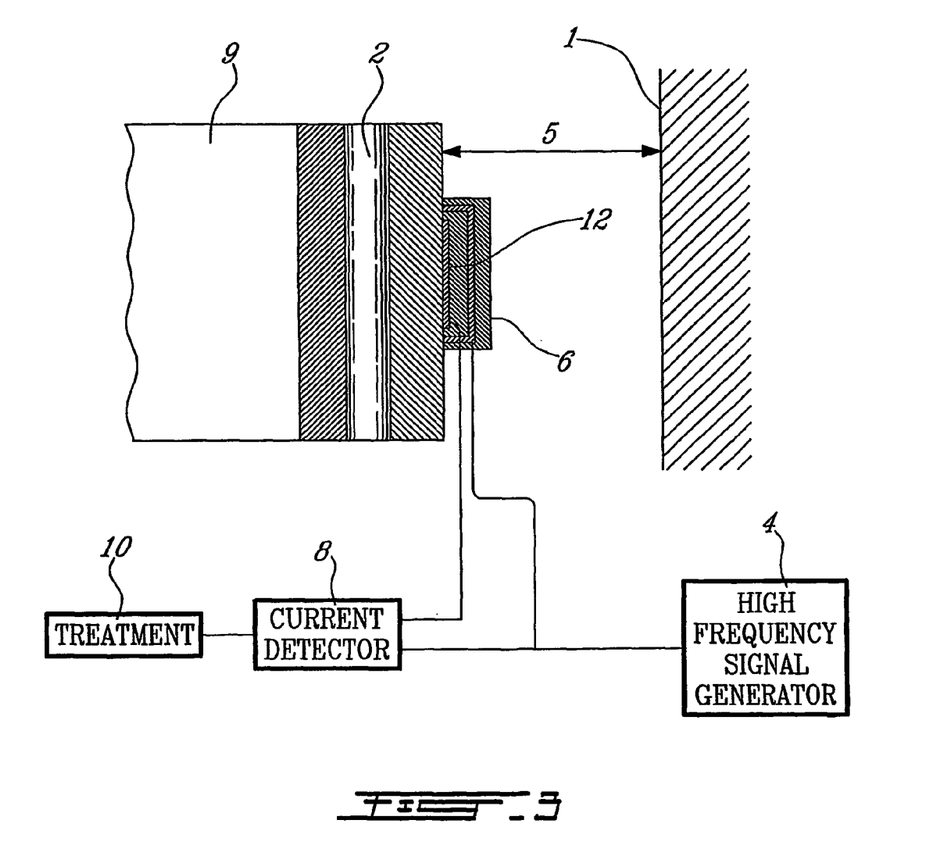
FIG. 3 shows by way of a functional diagram the means by which a capacitive sensor is fed and by which its voltage output is measured and processed.

As shown in FIG. 3, another advantage of this invention is the fact that the means of measurement through a capacitive sensor, as described in U.S. Pat. No. 4,675,670, can also be used here, with the differences that this time:

a) capacitive sensor 6 is "facing" conductive bars 9 of the stator instead of rotor 1 and detecting the variations of air gap 2 sandwiched between said conductive bars 9 and one or several layers of solid dielectric substances, and b) capacitive sensor 6 is detecting the change of permittivity of air gap 2 sandwiched between two or several solid dielectric layers.

As can be seen on FIG. 3, a high frequency signal (between 100 kHz and 10 MHz) with a voltage value comprised between 5 and 100 volts is fed by generator 4 to the two plates of sensor 6; current detector 8 measures through an insulating circuit, or through a high common mode rejection differential circuit, the current generated at the terminals of a shunt impedance mounted in series between generator 4 and sensor plate 12 from the high frequency value of the voltage signal returned by sensor 6.

Calculations show and experiments confirm that the high frequency voltage signals measured between conductive bars 9 and said second plate of sensor 6 vary as an inverse function of the distance constituted by air gap 2.

Let us suppose for the purpose of simplifying the calculations that quoin 19 and packing material 17 do not exist.

Let the capacitance associated with wedge 13 be $C_1$, and $\epsilon_{r1}$ its relative permittivity; let $d_1$ be its thickness. We have:

$C_1 = \epsilon_{r1}\epsilon_0 S_1/d_1$ where $\epsilon_0$ is the permittivity of the vacuum and $S_1$ is the surface of the capacitance $C_1$.

Let the capacitance of air gap 2 to be measured be $C_2$ and $\epsilon_{r2}$ its relative permittivity; let $d_2$ be its thickness. We have:

$C_2 = \epsilon_{r2}\epsilon_0 S_2/d_2$ where $\epsilon_0$ is the permittivity of the vacuum and $S_2$ is the surface of the capacitance $C_2$ Total capacitance $C_T$ of the system constituted by $C_1$ and $C_2$ is given by the general formula: $C_T = C_1 C_2/C_1 + C_2$, hence:

$$C_T = \epsilon_{r1}\epsilon_{r2}\epsilon_0^2 S_1 S_2/(\epsilon_{r2}\epsilon_0 S_2 d_1 + \epsilon_{r1}\epsilon_0 S_1 d_2).$$

If $S_2 = S_1$ and since $\epsilon_{r2} = 1$ (air), we obtain:

$$C_T = \epsilon_{r1}\epsilon_0 S_1/(d_1 + \epsilon_{r1} d_2)$$

If $d_2$ varies and becomes $d'_2$, $C_T$ varies and its variation $\Delta C_T$ becomes:

$$\Delta C_T = \epsilon_{r1}\epsilon_0 S_1 \left( \frac{.1}{d_1 + \epsilon_{r1} d'_2} - \frac{1}{d_1 + \epsilon_{r1} d_2} \right)$$

$$\Delta C_T = (\epsilon_0 S_1/d_1) \left( \frac{.1}{1/\epsilon_{r1} + d'_2/d_1} - \frac{1}{1/\epsilon_{r1} + d_2/d_1} \right)$$

Let $C_0 = \epsilon_0 S_1/d_1$
Then $$\Delta C_T = C_0 \left( \frac{.1}{1/\epsilon_{r1} + d'_2/d_1} - \frac{1}{1/\epsilon_{r1} + d_2/d_1} \right)$$

which is a hyperbolic function of the following shape:

$$y(x) = \frac{C_0}{ax+b} - k \quad (1)$$

where a, b, $C_0$ and k are constants and where $$a = 1/d_1$$

$$b = 1/\epsilon_{r1}$$

$$C_0 = \epsilon_{r1}\epsilon_0 S_1$$

$$k = C_0/(1/\epsilon_{r1} + d_2/d_1)$$

showing that the variation of measured capacitance due to the variation of the distance $d'_2$, is an inverse function of said distance.

EXAMPLES

To confirm the validity of the claimed invention, the following series of experiments were performed:

a capacitive sensor of the commercial kind as sold by the company VibroSystM Inc. and designated by the brand name of "VM 3.12" was fixed on the outer surface of a flat dielectric plate of known thickness abutting on a parallel conductive grounded plate, and the sensor was fed by a high frequency signal of 455 Khz and a voltage of 2.94 volts (calculated r.m.s.). The resulting voltage was measured between the second plate of the sensor which is closest to the conductive plate and said conductive plate.

the conductive plate was then progressively moved away but still in parallel with the dielectric plate in incremental variations of 200μ, corresponding to air gaps varying from 0 to 1,000μ and the corresponding voltage outputs were measured.

in a first experiment, the thickness of the dielectric substance was 6.35 mm, then incrementally increased in a second experiment to 12.7 nm, then to 19.05 mm, then to 25.4 mm then to 31.75 mm.

Figure 4:
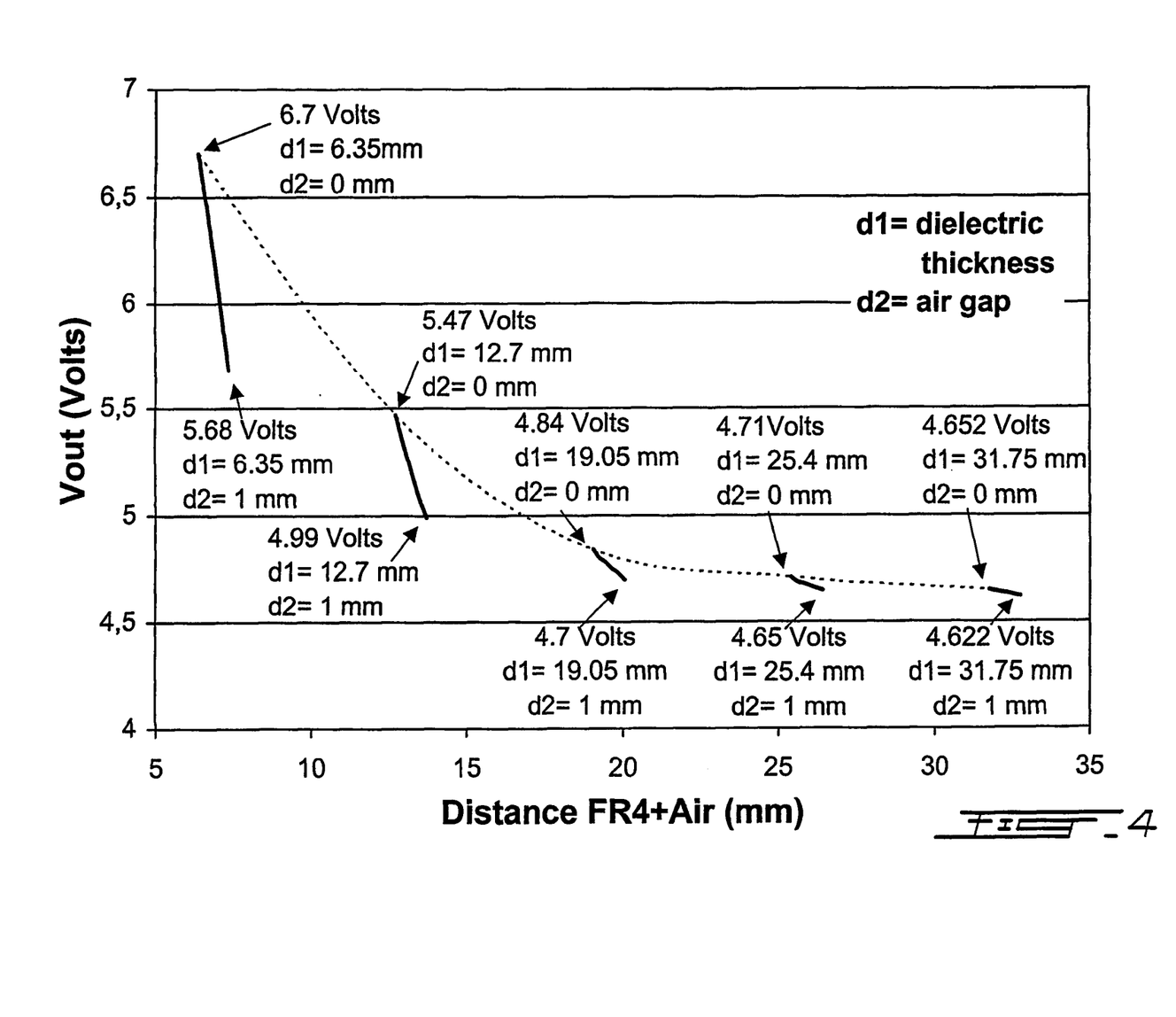
FIG. 4 is a graphic representation of the voltage measured by a capacitive sensor through a dielectric layer of given thickness as a function of the thickness of the air gap between a grounded conductive component and the dielectric surface facing said component.

As can be shown on FIG. 4, it is clear that the air gap variation can be read by the sensor through dielectric plates of various thickness, and that in each case corresponding to a given thickness of the dielectric plate, the voltage output as a function of the air gap can be closely approximated by a straight line and the variations of the air gap thus directly deduced from the voltage readings.

As can be shown by the arrows in Table 1 below derived from the same experiments, the air gap $d'_2$ which can be measured directly (i.e. without the interference of dielectric plates) in the second column, can also be measured through two different dielectric plates C1 as shown on the fourth and sixth columns, and the measurement of the slope of the varying air gap $d'_2$ which directly relates to the amplitude of its variation or vibration, remains the same, whether said air gap is measured directly or through plates which dielectric property varies. The only difference is that the air gap measurement through dielectrics is subject to a translation from the "only-air" scenario, which translation interval is given by formula (1) calculated above.

TABLE 1

| | | | | | | |
|---|---|---|---|---|---|---|
| S1= | 0.006 | | 0.006 | | 0.006 | |
| Eo= | 8.85E-12 | | 8.85E-12 | | 8.85E-12 | |
| E1= | 1 | | 4.16 | | 3.12 | |
| E2= | 1 | | 1 | | 1 | |
| d1= | 0 | | 0.025 | | 0.025 | |
| | total C vs distance (C1 does not exist) | | total C vs distance (dielectric E1=4,16) | | total C vs distance (dielectric E1=3,12) | |
| 1 | 2 | 3 | 4 | 5 | 6 | 7 |

| d2′ | total C | slope of total C | total C | slope of total C | total C | slope of total C |
|---|---|---|---|---|---|---|
| 0 | | | 8.84E-12 | | 6.63E-12 | |
| 1.00E-03 | 5.31E-11 | | 7.58E-12 | 1.26E-12 | 5.89E-12 | 7.35E-13 |
| 2.00E-03 | 2.66E-11 | 2.66E-11 | 6.63E-12 | 9.46E-13 | 5.30E-12 | 5.88E-13 |
| 3.00E-03 | 1.77E-11 | 8.85E-12 | 5.89E-12 | 7.36E-13 | 4.82E-12 | 4.82E-13 |
| 4.00E-03 | 1.33E-11 | 4.43E-12 | 5.30E-12 | 5.89E-13 | 4.42E-12 | 4.01E-13 |
| 5.00E-03 | 1.06E-11 | 2.66E-12 | 4.82E-12 | 4.82E-13 | 4.08E-12 | 3.40E-13 |
| 6.00E-03 | 8.85E-12 | 1.77E-12 | 4.42E-12 | 4.02E-13 | 3.79E-12 | 2.91E-13 |
| 7.00E-03 | 7.59E-12 | 1.26E-12 | | | 3.54E-12 | 2.52E-13 |
| 8.00E-03 | 6.64E-12 | 9.48E-13 | 3.79E-12 | 2.91E-13 | 3.32E-12 | 2.21E-13 |
| 9.00E-03 | 5.90E-12 | 7.38E-13 | 3.54E-12 | 2.53E-13 | 3.12E-12 | 1.95E-13 |
| 1.00E-02 | 5.31E-12 | 5.90E-13 | 3.32E-12 | 2.21E-13 | 2.95E-12 | 1.73E-13 |
| 1.10E-02 | 4.83E-12 | 4.83E-13 | 3.12E-12 | 1.95E-13 | | |
| 1.20E-02 | 4.43E-12 | 4.02E-13 | 2.95E-12 | 1.73E-13 | 2.65E-12 | 1.40E-13 |
| 1.30E-02 | | | 2.79E-12 | 1.55E-13 | 2.53E-12 | 1.26E-13 |
| 1.40E-02 | 3.79E-12 | 2.92E-13 | 2.65E-12 | 1.40E-13 | 2.41E-12 | 1.15E-13 |
| 1.50E-02 | 3.54E-12 | 2.53E-13 | 2.53E-12 | 1.26E-13 | 2.31E-12 | 1.05E-13 |
| 1.60E-02 | 3.32E-12 | 2.21E-13 | 2.41E-12 | 1.15E-13 | 2.21E-12 | 9.61E-14 |
| 1.70E-02 | 3.12E-12 | 1.95E-13 | 2.31E-12 | 1.05E-13 | 2.12E-12 | 8.84E-14 |
| 1.80E-02 | 2.95E-12 | 1.74E-13 | 2.21E-12 | 9.61E-14 | 2.04E-12 | 8.16E-14 |
| 1.90E-02 | | | 2.12E-12 | 8.84E-14 | 1.97E-12 | 7.56E-14 |
| 2.00E-02 | 2.66E-12 | 1.40E-13 | 2.04E-12 | 8.16E-14 | 1.90E-12 | 7.02E-14 |
| 2.10E-02 | 2.53E-12 | 1.26E-13 | 1.97E-12 | 7.56E-14 | 1.83E-12 | 6.53E-14 |
| 2.20E-02 | 2.41E-12 | 1.15E-13 | 1.90E-12 | 7.02E-14 | 1.77E-12 | 6.10E-14 |
| 2.30E-02 | 2.31E-12 | 1.05E-13 | 1.83E-12 | 6.53E-14 | 1.71E-12 | 5.70E-14 |
| 2.40E-02 | 2.21E-12 | 9.62E-14 | 1.77E-12 | 6.10E-14 | 1.66E-12 | 5.35E-14 |
| 2.50E-02 | 2.12E-12 | 8.85E-14 | 1.71E-12 | 5.71E-14 | 1.61E-12 | 5.02E-14 |
| 2.60E-02 | 2.04E-12 | 8.17E-14 | 1.66E-12 | 5.35E-14 | 1.56E-12 | 4.73E-14 |
| 2.70E-02 | 1.97E-12 | 7.56E-14 | 1.61E-12 | 5.03E-14 | 1.52E-12 | 4.46E-14 |
| 2.80E-02 | 1.90E-12 | 7.02E-14 | 1.56E-12 | 4.73E-14 | 1.47E-12 | 4.21E-14 |

This translation factor is important, as further tests have confirmed, because the system (sensor and signal conditioner) can then be calibrated for measuring a dielectric constituted of air alone, in such conditions that the calibrating bench includes all elements which may perturb static measurement (such as stator stacks which are then viewed as a grounded conducting surface), and then the output of the system in its real environment will be an electric signal which is already calibrated (if not saturated) for any variation of d2.

Figure 5:
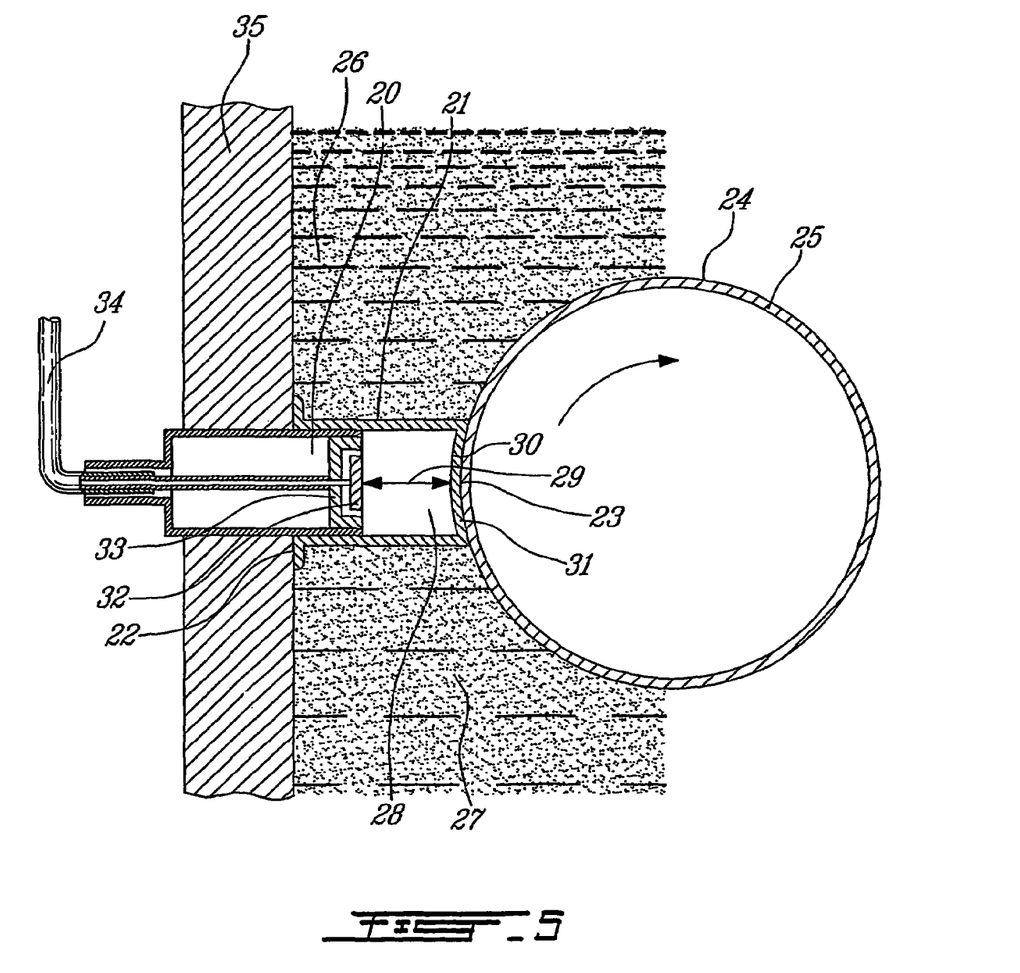
FIG. 5 is a cross section representing a cylindrical shaft rotating along its longitudinal axis in an atmosphere charged with particles of lubricant and the means of detection of its radial movements by a capacitive sensor.

Another industrial measurement problem can be solved by the present invention: when a shaft rotates in a turbulent atmosphere charged with particles of lubricant, it becomes very difficult to detect and measure the radial movements or vibrations of said shaft, with a capacitive sensor, since the air gap charged with particles is heterogeneous and no coherent measurement pattern emerges over time when said particle-charged air gap is measured. The present invention enables to solve said problem in the following way: as can be now shown on FIG. 5, a capacitive sensor 20 is equipped with a surrounding protective cover 21 which is made of a semi-rigid cylindrical dielectric material such as rubber, open at one extremity 22 and closed at the other extremity 23, which extends perpendicularly at its open extremity 22 from the inner surface of shaft enclosure 35, to which it is hermetically affixed, and which other closed extremity 23 brushes radially and tangentially against the outer surface 24 of a rotating metallic shaft 25. Said shaft 25 rotates in a turbulent atmosphere 26 charged with lubricating particles 27. The inside 28 of protective cover 21 is shielded from the lubricating particles, and a clean air gap 29 exists between the sensor head 32 and the interior surface 30 of the closed extremity 23. When outer surface 24 of shaft 25 vibrates or moves in any other way, closed extremity 23 of protective cover 21 moves in the same direction, and capacitive sensor 20 will measure the variation of the total capacitance constituted by air gap 29 and by dielectric layer 31 of protective cover 21. It then becomes obvious that we are confronted with a similar problem as that solved in the preferred embodiment, and that the radial movements of shaft 25 can be read by sensor 20 through the variation of the total capacitance between sensor head 32 and outer surface 24 of shaft 25, and signal processing can take place outside enclosure 35 through electrical signal transmission conduit 34 according to the same assembly as that described in FIG. 3. It must be noted that for anyone skilled in the art, it will be possible to modify the shape and dielectric material of protective cover 21 in such manner as to create an air gap 29 which is exempt from particles or dirt, and by which said protective cover constantly keeps brushing radially and tangentially against a rotating shaft.

It is also obvious from the calculations and the experiments described previously concerning the first preferred embodiment that if the air gap in front of the capacitive sensor remains constant, but if the air is replaced by another dielectric substance such as a liquid which flows through said air gap in front of said sensor, or which level varies in front of said sensor, this movement will be detected, and if the permittivities of the various dielectric layers interposed between the sensor and the conductive or semi-conductive component are known, as well as the thickness of the air gap, then the movement of the replacing fluid as well as the instantaneous position of its level can be detected and quantified.

SEQUENCE LISTING

Not Applicable

The invention claimed is:

1. A method for measuring the vibrations of a stator bar of an electric generator while in use, said vibrations corresponding to a distance to be measured over a period, said electrical generator having a layer of compressible dielectric substance wherein said layer of dielectric substance is sandwiched anywhere between several parallel layers of solid and fixed dielectric substances having each a constant but not necessarily identical permittivity, said layers being closely but variably spaced from a grounded conductive or semi-conductive surface, said stator bar acting as said grounded conductive or semi-conductive surface, said distance is an air gap between a stator-side surface of a tightening wedge of said stator bar and a rotor-side surface of said stator bar, the method comprising:

using a capacitive sensor installed from the outside, and without modifying the existing arrangement of parallel dielectric layers, on a rotor-side surface of said tightening wedge which is adjacent or forms part of an external surface of the first layer of said solid dielectric substances which is furthest from the grounded conductive or semi-conductive surface, said sensor being composed of a first conductive or semi-conductive plate which is parallel to the parallel layers of dielectric substances, said first plate being furthest from said first layer, and a second parallel superimposed conductive or semi-conductive plate which is nearest said first layer and electrically insulated from the first plate, and both plates being parallel to the parallel layers of dielectric substances;

feeding said first plate of said sensor a high frequency signal;

measuring over time the values of the current generated by said high frequency signal between the second plate and the grounded conductive or semi-conductive surface which faces the dielectric layers;

wherein the measured current varies as an inverse function of the thickness of said compressible dielectric substance, thereby enabling the determination of the amplitude of the variations of thickness of said compressible dielectric substance and hence said distance.

2. The method according to claim 1 wherein the compressible dielectric substance is one of air and gas.

3. The method according to claim 1, further comprising deducting from the variations of said current, the changes over time of the permittivity existing between the outer surface of the first dielectric layer and the facing surface of the grounded conductive or semi-conductive component due to the variation in thickness of said layer of compressible dielectric substance.

4. The method according to claim 3 allowing the detection of the passage or the measurement of the change of level of a fluid in front of a capacitive sensor, said passage or change of level occurring in an empty space located anywhere between parallel solid layers of dielectrics and a conductive or semi-conductive surface, whereby said sensor detects the change in permittivity caused by the beginning and by the end of the passage of the fluid in said space or by the arrival of the level of the fluid in the detecting zone of said space.

5. An apparatus for measuring the vibrations of a stator bar of an electric generator while in use, said vibrations corresponding to a distance to be measured over a period, said stator bar acting as a grounded conductive or semi-conductive surface, said distance is an air gap between a stator-side surface of a tightening wedge of said stator bar and a rotor-side surface of said stator bar, the apparatus comprising:

a capacitive sensor installed on a rotor-side surface of said tightening wedge, said sensor being composed of a first conductive or semi-conductive plate, said first plate being furthest from said stator-side surface of the tightening wedge, and a second conductive or semi-conductive plate which is nearest stator-side surface of a tightening wedge and electrically insulated from the first plate, and both plates being parallel to the rotor-side surface of said stator bar;

a high frequency signal generator for feeding said first plate of said sensor a high frequency signal while said electric generator is in use;

a current detector for measuring over time the values of the current generated by said high frequency signal between said second plate and the grounded conductive or semi-conductive surface which faces said stator-side surface of the tightening wedge;

a treatment unit receiving the measured current, wherein the measured current varies as an inverse function of said distance, thereby enabling the determination of said distance over a period and hence said vibrations.

6. A method for measuring the vibrations of a stator bar of an electric generator while in use, said vibrations corresponding to a distance to be measured over a period, said stator bar acting as a grounded conductive or semi-conductive surface, said distance is an air gap between a stator-side surface of a tightening wedge of said stator bar and a rotor-side surface of said stator bar, the method comprising:

using a capacitive sensor installed on a rotor-side surface of said tightening wedge, said sensor being composed of a first conductive or semi-conductive plate, said first plate being furthest from said stator-side surface of the tightening wedged, and a second conductive or semi-conductive plate which is nearest stator-side surface of a tightening wedge and electrically insulated from the first plate, and both plates being parallel to the rotor-side surface of said stator bar;

feeding said first plate of said sensor a high frequency signal while said electric generator is in use;

measuring over time the values of the current generated by said high frequency signal between said second plate and the grounded conductive or semi-conductive surface which faces said stator-side surface of the tightening wedge;

wherein the measured current varies as an inverse function of said distance, thereby enabling the determination of said distance over a period and hence said vibrations.

* * * * *